Patented July 7, 1931

1,813,606

UNITED STATES PATENT OFFICE

JOSEPH BINAPFL, OF KREFELD, AND WILLI KREY, OF UERDINGEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF OBTAINING OXYGENATED COMPOUNDS FROM ALKYL BENZENES

No Drawing. Application filed December 23, 1927, Serial No. 242,284, and in Germany December 23, 1926.

The invention relates to a process of obtaining valuable oxygenated compounds from alkyl benzenes with two or more carbon atoms in the side chain by oxidizing them by means of oxygen or gases containing oxygen. It is especially characterized by carrying out the oxidation in the liquid phase at elevated temperatures in the presence of catalysts.

We have found that by treating alkyl benzenes with two or more carbon atoms in the side chain in the liquid phase with oxygen or gases containing oxygen at elevated temperatures and in the presence of certain catalysts derived from heavy metals, the oxygen shows a specific affinity for the carbon atom attached to the benzene nucleus in the alpha position and attacks this carbon atom first. The oxidation passes through several stages which may be partly isolated. The first recognizable stage results in the formation of a compound which is soluble in alkaline hydroxides and shows properties resembling superoxide. This stage apparently accomplishes an addition of oxygen to the carbon atom in the alpha position. This intermediate product changes in two directions. On the one hand carbinols are formed, but at the same time formation of ketones takes place. The product of oxidation, for example, in the case of ethyl-benzene, therefore, is a mixture of acetophenone and methyl phenyl carbinol, the first prevailing. In quite an analogous way oxidation takes place in the cases of the higher normal homologues of ethyl benzene such a n-propyl benzene, n-butyl benzene etc. The homologues with a branched side chain such as isopropyl benzene partly lose one methyl group by oxidation. Besides the corresponding carbinol, a ketone with one carbon atom less in the side chain is formed. Thus in the case of isopropyl benzene besides dimethyl phenyl carbinol one obtains acetophenone.

The catalysts effecting this oxidation are of different kinds. Above all the oxides and hydroxides of heavy metals and their salts with organic acids give excellent results. The state of division of the catalyst is of substantial importance to the process inasmuch as a more finely divided catalyst of a great surface has an increased oxidizing effect. Therefore, compounds of heavy metals which may be used in the colloid state have been found to be most efficacious. Among the catalysts adapted to carrying out the process the following may be named: silver oxide, copper oxide, copper hydroxide, zinc oxide, zinc hydroxide, manganese hydroxide, ferric oxide, ferric hydroxide, nickel oxide, nickel hydroxide, cobalt oxide, cobalt hydroxide, acetate, benzoate, stearate, resinate of iron, manganese etc. These catalysts may be used both alone and mixed with each other or precipitated upon inert substances such as pumice, calcium carbonate, silica gel etc.

The interval of operable temperature ranges from about 50° C. to the boiling point of the hydrocarbon to be oxidized; the temperature in each case depends upon the catalyst used. A typical feature of the invention consists in oxidizing the hydrocarbons in the liquid phase.

In order to carry out the process the hydrocarbon to be oxidized and the catalyst are brought into a cylindrical vessel having a device for introducing oxygen or gases containing oxygen such as air in the lower part of the vessel. The current of gas bubbles through the liquid and passes through a cooling coil with a device for separating the water formed. When the oxidation has progressed to the desired point, the resulting products are isolated by fractional distillation.

The invention is illustrated by the following examples without being limited to them:

1. A catalyst is prepared by precipitating an aqueous solution of 10 parts of copper nitrate by means of a 30 percent solution of sodium hydroxide, heating to 90 to 100° C. and decanting, filtering, washing and drying the precipitate at about 100° C. This catalyst is added to 500 parts of ethyl benzene, the mixture being treated with a vigorous current of air at 120° C. for 30 hours. By a subsequent fractional distillation 300 parts of ethyl benzene are recovered, while the remainder boiling at 200 to 215° C. consists of a mixture of about 80 percent acetophenone and 20 percent methyl phenyl carbinol.

In order to isolate pure acetophenone the carbinol may be removed by means of concentrated sulfuric acid or oxidized in a well known manner to acetophenone.

2. A catalyst is prepared by precipitating an aqueous solution of ferric chloride containing 160 parts per litre by means of ammonia, and decanting, filtering and drying the precipitate at about 100° C. 20 parts of the resulting ferric hydroxide are added to 2000 parts of ethyl benzene and the mixture is treated with a current of oxygen at 95 to 100° C. for 29 hours. During this time 55 parts of water are obtained. By fractional distillation 1400 parts of unchanged ethyl benzene are recovered; the residue boiling at 200 to 215° consists of 80 percent acetophenone and 20 parts of phenyl methyl carbinol as shown in Example 1.

3. 800 parts of ethyl benzene and 8 parts of a red iron oxide pigment, calcined at 650° C., are mixed and the mixture is treated with a current of oxygen at 130 to 140° C. for 7 hours; 22 parts of water being obtained. By a subsequent fractional distillation 590 parts of unchanged ethyl benzene are recovered; the residue consists of a mixture of 80 percent acetophenone and 20 percent methyl phenyl carbinol.

4. 15 parts of iron oxide, obtainable by using iron in the presence of a diluted aqueous solution of an aluminum salt in the reduction of nitro benzene to aniline, separating the aniline thus formed and after purifying and drying the residue calcining the iron hydroxide thus obtained to the corresponding iron oxide, are added to 1500 parts of ethyl benzene. A current of oxygen is passed through this mixture during 7 hours in which time 42 parts of water are obtained. By a subsequent fractional distillation 1060 parts of unchanged ethyl benzene are recovered, the residue consisting of a mixture of 80 percent acetophenone and 20 percent methyl phenyl carbinol.

5. A catalyst is prepared by precipitating a 10 percent aqueous solution of zinc acetate by means of the calculated amount of a solution of sodium hydroxide and decanting, filtering and drying the precipitate at 100° C. in vacuo. 20 parts of this catalyst are added to 1500 parts of ethyl benzene and a current of oxygen is passed through the mixture at 100° C. for 8 hours. By a subsequent fractional distillation 1250 parts of unchanged ethyl benzene are recovered; the residue consists of acetophenone, methyl phenyl carbinol and the superoxide-resembling intermediate product above referred to. About 10 percent of this intermediate product are present in the residue which may be removed by extraction with a solution of an alkaline hydroxide.

6. A catalyst is prepared by adding 105 parts of marble powder to a solution of 63 parts of manganese chloride in 500 parts of water, precipitating the manganese by the calculated amount of a solution of sodium hydroxide and decanting, filtering and drying the precipitate at 100° C. 30 parts of this catalyst are added to 800 parts of ethyl benzene and a current of oxygen is passed through the liquid at 130 to 140° C. for 7 hours; 37 parts of water being obtained. By a subsequent fractional distillation 470 parts of unchanged ethyl benzene are recovered; the residue consists of 80 percent acetophenone and 20 percent methyl phenyl carbinol.

7. A catalyst is prepared by stirring 100 parts of marble powder, 100 parts of copper nitrate and 300 parts of water at 100° C. for one hour, boiling with 3 parts of a 30 percent aqueous solution of sodium hydroxide till the precipitate has a brown black color and decanting, filtering and drying it at 100° C. 50 parts of this catalyst are added to 800 parts of ethyl benzene and a current of air is passed through the mixture at 105 to 120° C. for 39 hours (30 litres per hour). Besides unchanged ethyl benzene, 210 parts of a mixture consisting of 80 percent acetophenone and 20 percent methyl phenyl carbinol are obtained.

8. A catalyst is prepared by stirring 100 parts of marble powder, 100 parts of nickel nitrate and 300 parts of water at 100° C., for one hour, boiling with 3 parts of a 30 percent aqueous solution of sodium hydroxide and decanting, filtering and drying the precipitate at 100° C. 40 parts of this catalyst are added to 800 parts of ethyl benzene and a current of oxygen is passed through the mixture at 130 to 140° C. for 11 hours; 32 parts of water being obtained. By a subsequent fractional distillation 470 parts of unchanged ethyl benzene are recovered, the residue consisting of a mixture of 80 percent acetophenone and 20 percent methyl phenyl carbinol.

9. 75 parts of a copper oxide catalyst prepared according to Example 7 are added to 1500 parts of isopropyl benzene and a current of oxygen is passed through the mixture at 140° for 14 hours; 98 parts of water being obtained. By a subsequent fractional distillation 930 parts of unchanged isopropyl benzene are recovered, the bulk of the residue being a mixture of 70 percent acetophenone and 30 percent dimethyl phenyl carbinol. The escaping waste gas contains traces of formaldehyde.

10. 15 parts of a copper oxide catalyst prepared according to Example 7 are added to 600 parts of isopropyl benzene and a current of air is passed through the liquid at 100 to 110° C. for 32 hours. By a subsequent fractional distillation 360 parts of isopropyl benzene are recovered, the bulk of the residue consisting of dimethyl phenyl carbinol (b. p. 93–95° C./13 mm.).

11. 15 parts of iron stearate (prepared by precipitating a solution of sodium stearate by the calculated amount of ferrous chloride and filtering and drying the precipitate at 100° in the presence of air) are dissolved in 1500 parts of ethyl benzene and a current of oxygen is passed through the liquid at 130 to 140° C. for 8 hours. By a subsequent fractional distillation 1070 parts of unchanged ethyl benzene are recovered, the residue being a mixture of 70 percent acetophenone and 30 percent methyl phenyl carbinol.

12. 8 parts of iron benzoate (prepared by precipitating sodium benzoate by the equivalent amount of ferrous chloride and filtering and drying the precipitate at 100° C. in the presence of air) are dissolved in 800 parts of ethyl benzene and a current of oxygen is passed through the liquid at 130 to 140° C. for 7 hours; 42 parts of water being obtained. By a subsequent fractional distillation 530 parts of ethyl benzene are recovered, the residue being a mixture of 80 percent acetophenone and 20 percent methyl phenyl carbinol.

13. 15 parts of Prussian blue (prepared by adding 13 parts of ferric chloride dissolved in 50 parts of water to 21 parts of potassium ferro cyanide dissolved in 100 parts of water and filtering and drying the precipitate) are added to 1500 parts of ethyl benzene and a current of oxygen is passed through the liquid at 130 to 140° C. for 8 hours. By a subsequent fractional distillation 1190 parts of unchanged ethyl benzene are recovered, the residue consisting of a mixture of 80 percent acetophenone and 20 percent of methyl phenyl carbinol.

14. A catalyst of manganese resinate is prepared by extracting rosin with a 10 percent solution of sodium hydroxide and precipitating this solution by an equivalent amount of a solution of manganese chloride. 15 parts of this manganese resinate are dissolved in 1500 parts of ethyl benzene and a current of oxygen is passed through the liquid at 130 to 140° C. for 8 hours. By a subsequent fractional distillation 1380 parts of unchanged ethyl benzene are recovered, the residue consisting of a mixture of 75 percent acetophenone and 25 percent methyl phenyl carbinol.

We claim:—

1. A process of obtaining oxygenated compounds from alkyl benzenes with two or more carbon atoms in the side chain which comprises reacting upon an alkyl benzene in liquid phase with a gas containing oxygen at a temperature above 50° C. in the presence of an inorganic oxygen carrier comprising a compound of a heavy metal.

2. A process of obtaining oxygenated compounds from alkyl benzenes with two or more carbon atoms in the side chain which comprises reacting upon an alkyl benzene in liquid phase with a gas containing oxygen at a temperature above 50° C. in the presence of an inorganic oxygen carrier comprising an oxygen containing compound of a heavy metal.

3. A process of obtaining oxygenated compounds from alkyl benzenes with two or more carbon atoms in the side chain which comprises reacting upon an alkyl benzene in liquid phase with a gas containing oxygen at a temperature above 50° C. in the presence of an inorganic oxygen carrier comprising an oxide of a heavy metal.

4. A process of obtaining oxygenated compounds from alkyl benzenes with two or more carbon atoms in the side chain which comprises reacting upon an alkyl benzene in liquid phase with a gas containing oxygen at a temperature above 50° C. in the presence of a finely divided copper oxide.

5. A process of obtaining acetophenone and methyl phenyl carbinol from ethyl benzene which comprises reacting upon liquid ethyl benzene with a gas containing oxygen at a temperature between 50° C. and the boiling point of ethyl benzene in the presence of an inorganic oxygen carrier comprising a compound of a heavy metal.

6. A process of obtaining acetophenone and methyl phenyl carbinol from ethyl benzene which comprises reacting upon liquid ethyl benzene with air at a temperature between 90° C. and 135° C. in the presence of finely divided copper oxide.

In testimony whereof we have hereunto set our hands.

JOSEPH BINAPFL.
WILLI KREY.